H. B. SNELL.
SHOCK ABSORBER.
APPLICATION FILED JULY 3, 1916.

1,230,938.

Patented June 26, 1917.

INVENTOR
Harry B. Snell.
BY
George J. Oltsch
ATTORNEY

UNITED STATES PATENT OFFICE.

HARRY B. SNELL, OF SOUTH BEND, INDIANA.

SHOCK-ABSORBER.

1,230,938. Specification of Letters Patent. Patented June 26, 1917.

Application filed July 3, 1916. Serial No. 107,353.

*To all whom it may concern:*

Be it known that I, HARRY B. SNELL, a citizen of the United States, residing at South Bend, in the county of St. Joseph and State of Indiana, have invented certain new and useful Improvements in Shock-Absorbers, of which the following is a specification.

The invention relates to an improvement in shock absorbers designed particularly for automobile springs, whereby the too sudden or rapid rebound of the spring will be snubbed and the jarring, jolting and vibration due thereto materially lessened.

The invention comprehends a shock absorber involving an auxiliary spring mounted upon the main spring supporting the automobile body to provide a yielding resistance to the upper movement of the main spring beyond its normal position, combined with means for adjusting the auxiliary spring tension in accordance with the load to be supported by the main spring, whereby the force of the reflex action of the main spring, which varies with the load, may be opposed with just the proper tension of the auxiliary spring to cushion and gradually reduce the force thereof, thereby materially reducing the shock and jarring which would otherwise be experienced by the occupants of the automobile.

The invention in the preferred form of details will be described in the following specification, reference being had particularly to the accompanying drawings, in which:—

Figure 1:
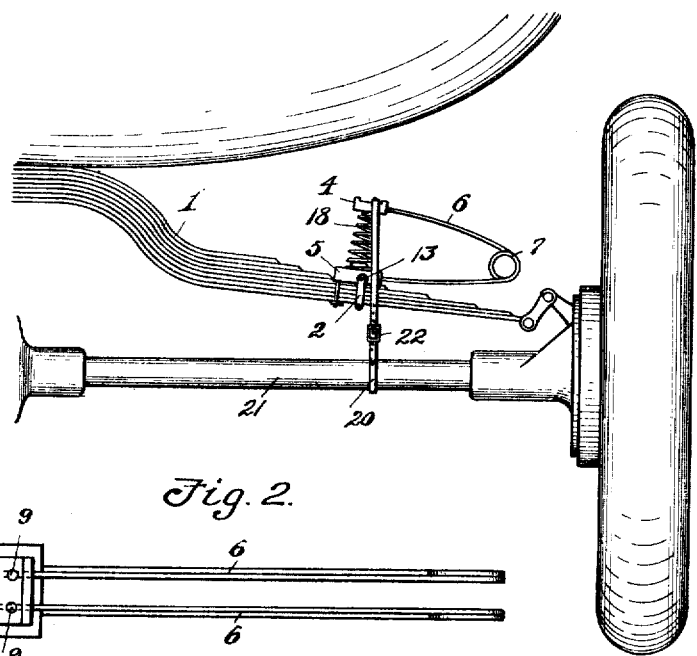
Figure 1 is a view in elevation illustrating the application of the improved shock absorber.
Figure 2:
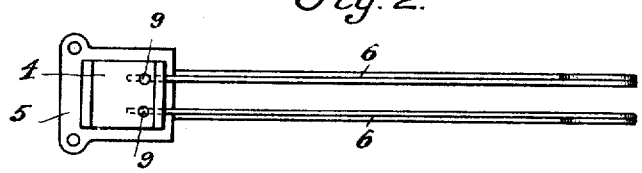
Fig. 2 is a top or plan view of the shock absorber with the adjusting strap omitted.
Figure 3:
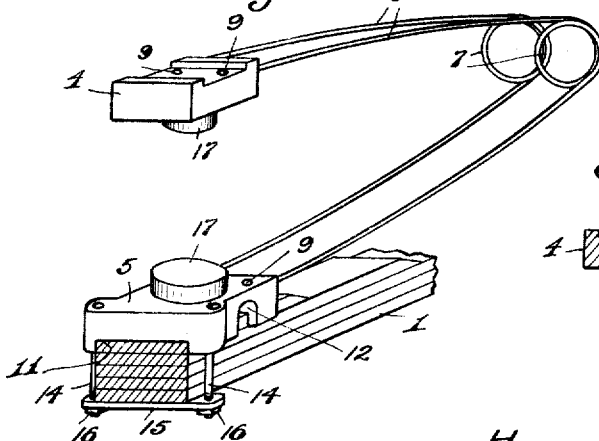
Fig. 3 is a similar view in perspective showing the application thereof to a vehicle spring, the latter being shown in a fragmentary sectional form.
Figure 4:
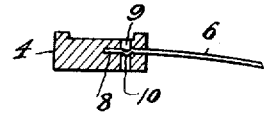
Fig. 4 is a section of one of the bearing blocks and terminal of one of its supporting arms, illustrating the manner of securing said parts together.

My improved shock absorber is primarily intended for use in connection with automobiles employing transversely disposed leaf springs 1 to support the body, and which will be hereinafter generally designated as the main spring. The leaves of the spring are, as usual, secured against displacement by spring clips 2.

The shock absorber comprises spaced upper and lower bearing blocks 4 and 5, which are joined by spaced duplicate spring arms 6, preferably made of heavy spring wire, and coiled, as at 7, so as to bring the terminals thereof in opposing relation so as to form a yielding connection between said bearing blocks, the blocks being secured to the terminals of the arms in any suitable manner, preferably by providing the bearing blocks with bored sockets 8 of a dimension to snugly fit the terminals of the arms 6 inserted therein, and cross apertures intersecting said sockets, as at 9, whereby a tool may be inserted into the apertures and the terminals crimped, as at 10, so that the same can not be withdrawn from their sockets, and a simple and secure connection thus provided.

The bearing block 5 is substantially of rectangular form, which is formed on its under surface in one direction with a recess 11 to snugly fit over and engage the upper leaf of the main spring 1, and is also recessed at 12 at right angles to the recess 11 to fit over the bolt 13 of the particular spring clip 2, the latter serving in a measure as a stop for the block to prevent shifting thereof relatively of the main spring. The block is further secured to the main spring and prevented from shifting thereon by bolts 14 extending through the block and a clip plate 15 beneath the spring, and nuts 16 for drawing said parts together to firmly clamp the block to the main spring.

The bearing blocks 4 and 5 are provided on their opposing faces with studs 17 adapted to receive and extend into the opposing end coils of an auxiliary spring 18 tensioned for expansion, the lugs serving to prevent displacement of the spring relatively of the blocks. The terminals of the spring arms 6 are tensioned to approach each other but of less tension than the auxiliary spring 18, whereby connection between said spring and arms will always be maintained under all expansive and contractive adjustments of the auxiliary spring.

A particularly important feature of the invention resides in the provision of means for adjusting the tension of the auxiliary spring in accordance with the load to which the main spring may be subjected. The said means comprises a strap 20 passed over the bearing block 4 and about the vehicle axle 21, and its terminals connected by a buckle 22 of the usual type, which will permit the loop formed by the strap to be shortened or lengthened, as may be desired, and the distance between the bearing blocks 4 and 5 adjusted accordingly, from which it follows that the auxiliary spring between said blocks will have its tension increased or decreased, as the case may be. The strap 20 in no wise interferes with the downward movement of the main spring, and serves to limit or snub the upward movement of the auxiliary spring so that the latter will absorb or take up the rebound action of the main spring, thereby eliminating the severe jolting and jarring otherwise resulting from the sudden and rapid rebound action of the main spring.

While the foregoing is the preferred form of my invention, I desire it to be understood that I do not limit myself to the precise structure shown and described, as it is obvious that the same may be variously modified without departing from the spirit of the invention.

What is claimed is:—

1. A shock absorber including opposing bearing members, a contractive spring connecting said members, an expansion spring interposed between the bearing members, the expansion spring having a greater tension than the contractive spring, and means for limiting the degree of separation of the bearing members.

2. A shock absorber including opposing bearing blocks, a contractive spring connecting said blocks, means for securing one of said blocks to the main spring of the vehicle, an expansion spring arranged between the bearing blocks, and means for adjusting the normal distance between the bearing blocks to vary the normal tension of the auxiliary spring.

3. A shock absorber including opposing upper and lower bearing blocks, means connecting and impelling movement of the blocks in the direction of each other, means for securing the lower block to the main spring of the vehicle, an auxiliary expansion spring arranged between said blocks having a greater expansive force then the contractive force of the block connecting means, and means for limiting the upward movement of the upper bearing block.

4. A shock absorber including upper and lower opposing bearing blocks, contractive means connecting said blocks, means for securing one of said blocks to the main spring of the vehicle, an auxiliary expansion spring arranged between the bearing blocks, and a strap connecting the axle with the upper bearing block to limit the upward movement of the latter.

5. The combination with the main spring and axle of a vehicle, of an auxiliary spring mounted on the main spring, contractive means mounted upon and movable relatively of the main spring for the support of the auxiliary spring, and adjustable means connecting the axle and said spring supporting means to limit the upward movement of the auxiliary spring.

In testimony whereof I affix my signature in presence of two witnesses.

HARRY B. SNELL.

Witnesses:
GEORGE J. OLTSCH,
AGNES GORDON.

Copies of this patent may be obtained for five cents each, by addressing the "Commissioner of Patents, Washington, D. C."